(12) United States Patent
Jung et al.

(10) Patent No.: US 9,796,381 B2
(45) Date of Patent: Oct. 24, 2017

(54) AUTOMATIC PARKING ASSIST SYSTEM AND METHOD FOR OPERATING THE SAME

(71) Applicant: Hyundai Motor Company, Seoul (KR)

(72) Inventors: Chan Hee Jung, Gwacheon-si (KR); Jin Ho Park, Hwaseong-si (KR); Joo Woong Yang, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/140,145

(22) Filed: Apr. 27, 2016

(65) Prior Publication Data

US 2017/0101090 A1 Apr. 13, 2017

(30) Foreign Application Priority Data

Oct. 13, 2015 (KR) .................. 10-2015-0143028

(51) Int. Cl.
*B60W 30/06* (2006.01)
*B60W 10/04* (2006.01)

(52) U.S. Cl.
CPC .......... *B60W 30/06* (2013.01); *B60W 2420/52* (2013.01); *B60W 2520/00* (2013.01); *B60W 2520/14* (2013.01)

(58) Field of Classification Search
CPC ....... B60W 30/06; B60W 10/04; B60Q 9/006; G01C 21/165; B63D 15/027; G08G 1/168; B60K 31/0008
See application file for complete search history.

(56) References Cited

U.S. PATENT DOCUMENTS

| 6,604,592 | B2 * | 8/2003 | Pietsch | B60K 31/0008 180/168 |
| 2006/0220910 | A1 * | 10/2006 | Becker | B60Q 9/006 340/932.2 |
| 2007/0279199 | A1 * | 12/2007 | Danz | B60Q 9/006 340/435 |
| 2008/0266139 | A1 * | 10/2008 | Kim | B62D 15/027 340/932.2 |
| 2011/0257920 | A1 * | 10/2011 | Onda | G01C 21/165 702/94 |
| 2016/0001774 | A1 * | 1/2016 | Nakada | B60W 10/04 701/22 |
| 2016/0148514 | A1 * | 5/2016 | Iwami | G08G 1/168 340/932.2 |

(Continued)

FOREIGN PATENT DOCUMENTS

JP 2006-335239 A 12/2006
JP WO 2014006993 A1 * 1/2014 ............ B60W 10/04

(Continued)

*Primary Examiner* — Yuri Kan
(74) *Attorney, Agent, or Firm* — Brinks Gilson & Lione (57) ABSTRACT

The present disclosure relates to an automatic parking assist system and a method for operating the same. The automatic parking assist system includes a parking slot searcher configured to search a surrounding of a vehicle and obtain parking slot search information; a vehicle sensor configured to sense behavior information of the vehicle; and a controller configured to determine parking velocity of the vehicle by taking account of the parking slot search information and the behavior information, and perform a parking of the vehicle in a parking slot at the parking velocity.

14 Claims, 7 Drawing Sheets

(56) References Cited

U.S. PATENT DOCUMENTS

2016/0203377 A1* 7/2016 Irie ................. G08G 1/168
  348/118

FOREIGN PATENT DOCUMENTS

| JP | WO-2014006993 A1 * | 1/2014 | ............ B60W 10/04 |
|----|----|----|----|
| JP | 2014-024462 A | 2/2014 | |
| JP | 2014-141216 A | 8/2014 | |
| JP | 2014-008939 A | 1/2016 | |
| KR | 10-1038664 B | 6/2011 | |
| KR | 10-2012-0069052 A | 6/2012 | |
| KR | 10-1362744 B | 2/2014 | |

* cited by examiner

AUTOMATIC PARKING ASSIST SYSTEM AND METHOD FOR OPERATING THE SAME

CROSS-REFERENCE TO RELATED APPLICATION

The present application is based on and claims the benefit of priority to Korean Patent Application No. 10-2015-0143028, filed on Oct. 13, 2015 in the Korean Intellectual Property Office, the disclosure of which is incorporated herein in its entirety by reference.

TECHNICAL FIELD

The present disclosure relates to an automatic parking assist system capable of determining parking velocity by taking account of search velocity of a parking slot of a driver, an area of the parking slot, and a surrounding environment of the parking slot at the time of searching the parking slot and performing a parking at the determined parking velocity, and a method for operating the same.

BACKGROUND

An automatic parking assist system generates a parking trajectory for parking a vehicle in a target parking slot when a driver selects a parking mode, a parking direction, and a target parking slot, and parks the vehicle by following the generated parking trajectory. The automatic parking assist system assists the parking by recognizing a space using ultrasonic sensors installed on a front/rear/side of the vehicle and automatically performing acceleration, braking, steering wheel, and the like.

Unlike a case in which a parking steering assistance system controls only the steering wheel to assist the parking into a searched parking slot and the driver performs acceleration/deceleration and a shift, the automatic parking assist system takes charge of a vehicle velocity control and a shift control using an electric stability control (ESC) and a shift by wire (SEW). The driver performs a parking slot search, and performs an automatic parking using a button in the vehicle or a smart key after getting out of the vehicle. For this reason, the automatic parking assist system has an advantage capable of providing convenience to the driver who only needs to perform the parking search and increasing marketability.

When the driver actually performs the parking, the parking velocity is changed depending on surrounding parking slots or whether or not the parking slot is narrow. However, since the automatic parking assist system performs the parking at a set velocity without taking account of surrounding situations, an awareness of difference may be caused, which may be a complaint for the system.

SUMMARY

The present disclosure has been made to address the above-mentioned problems occurring in the prior art while advantages achieved by the prior art are maintained intact.

An aspect of the present disclosure provides an automatic parking assist system capable of determining parking velocity by taking account of search velocity of a parking slot of a driver, an area of the parking slot, and a surrounding environment of the parking slot at the time of searching the parking slot and performing a parking at the determined parking velocity, and a method for operating the same.

In exemplary forms of the present disclosure, an automatic parking assist system includes a parking slot searcher configured to search a surrounding of a vehicle and obtain parking slot search information; a vehicle sensor configured to sense behavior information of the vehicle; and a controller configured to determine parking velocity of the vehicle by taking account of the parking slot search information and the behavior information, and perform a parking of the vehicle in a parking slot at the parking velocity.

The parking slot searcher may be configured of any one or more of a plurality of ultrasonic sensors, radar, and lidar.

The vehicle sensor may include a vehicle velocity sensor configured to measure velocity of the vehicle; and a steering angle sensor configured to measure a steering angle of the vehicle.

The controller may include a module for calculating search velocity configured to calculate search velocity of the parking slot of a driver using the parking slot search information; a module for calculating a narrow state of a parking slot configured to calculate the narrow state of the parking slot using the parking slot search information; a module for calculating a narrow state of a surrounding area configured to calculate the narrow state of the surrounding area other than the parking slot using the parking slot search information; and a module for determining parking velocity configured to calculate the parking velocity by taking account of the search velocity of the parking slot, the narrow state of the parking slot, and the narrow state of the surrounding area.

The module for calculating search velocity may calculate average search velocity of velocity at which a driver searches the parking slot.

The module for calculating search velocity may calculate weight of the average search velocity to maximum searchable velocity.

The module for calculating a narrow state of a parking slot may calculate weight of the parking slot to a minimum parkable slot.

The module for calculating a narrow state of a surrounding area may calculate weight according to a distance between a self vehicle and a surround obstacle to a parking assistable minimum distance between the self vehicle and the surrounding obstacle.

In another exemplary form of the present disclosure, a method for operating an automatic parking assist system includes searching a surrounding of a vehicle and obtaining parking slot search information; calculating search velocity of a parking slot, a narrow state of the parking slot, and a narrow state of a surrounding area on the basis of the parking slot search information; determining parking velocity by taking account of the search velocity of the parking slot, the narrow state of the parking slot, and the narrow state of the surrounding area; and performing a parking of the vehicle in the parking slot at the parking velocity.

In the searching of the surrounding of the vehicle, the parking slot and a surrounding area other than the parking slot may be searched using sensors mounted on a front, a side, and a rear of the vehicle.

The sensors may be configured of any one or more of an ultrasonic sensor, radar, and lidar.

The calculating of the search velocity of the parking slot, the narrow state of the parking slot, and the narrow state of the surrounding area may include calculating average search velocity at which a driver searches the parking slot; and calculating weight of the average search velocity to maximum searchable velocity.

In the calculating of the search velocity of the parking slot, the narrow state of the parking slot, and the narrow state of the surrounding area, weight of the parking slot to a minimum parkable slot may be calculated.

In the calculating of the search velocity of the parking slot, the narrow state of the parking slot, and the narrow state of the surrounding area, weight of a distance between a self vehicle and an obstacle to a parking assistable minimum distance between the self vehicle and the surrounding obstacle may be calculated.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary forms of the present disclosure will be described in detail with reference to the accompanying drawings.

Figure 1:
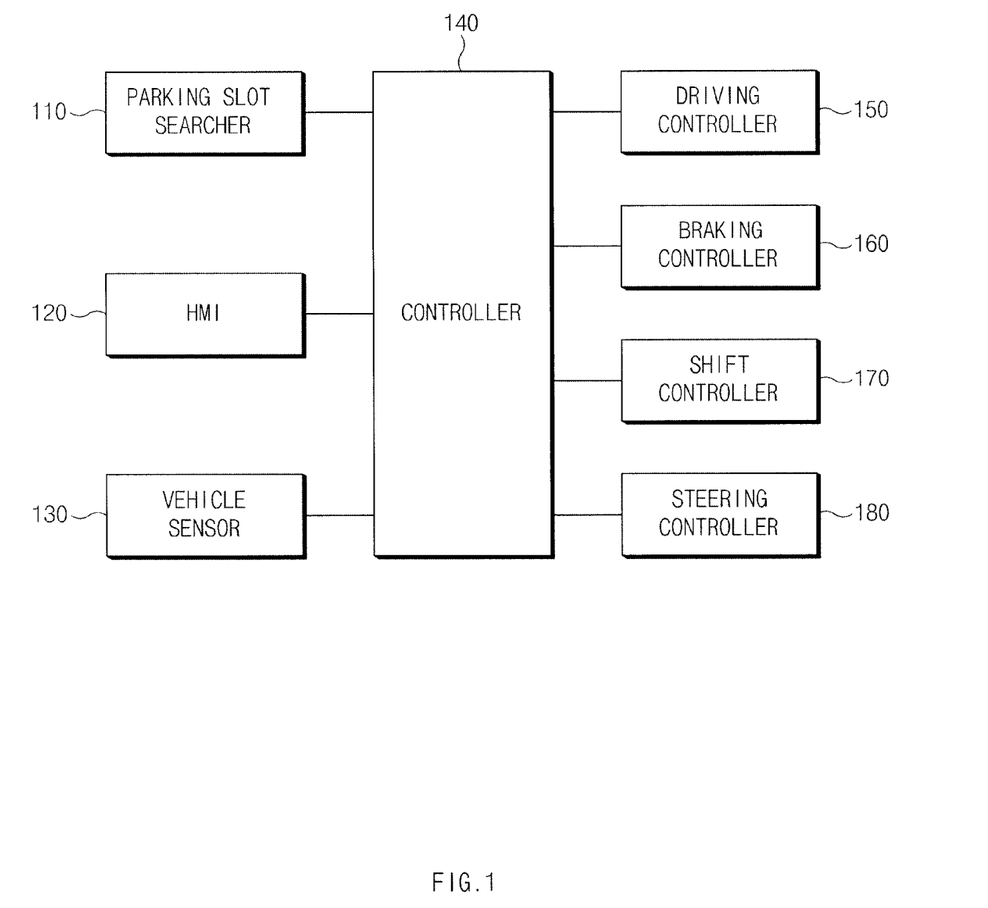
FIG. 1 is a block configuration diagram of an automatic parking assist system.

FIG. 1 illustrates a block configuration diagram of an automatic parking assist system.

As illustrated in FIG. 1, an automatic parking assist system includes a parking slot searcher 110, a human machine interface (HMI) 120, a vehicle sensor 130, a controller 140, a driving controller 150, a braking controller 160, a shift controller 170, and a steering controller 180.

The parking slot searcher 110 searches a parking slot, and includes information including a size of the searched parking slot, a surrounding environment thereof, and the like. Here, as surrounding environment information, information including positions of surrounding obstacles or other parked vehicles, distance from the obstacles, and the like is obtained.

The parking slot searcher 110 may be configured of an ultrasonic sensor, radar, and/or lidar, and one or more parking slot searchers 110 may be installed on a front, a rear, and a side of a vehicle, respectively.

The HMI 120 that interfaces between a user and the automatic parking assist system, includes an input means and an output means. The input means includes a switch, a button, a keypad, and the like, and the output means includes a speaker, a cluster, a display, and/or the like.

The HMI 120 transfers input data according to a manipulation of the user (e.g., a driver) to the controller 140, and outputs a progress situation and a result according to an operation of the controller 140 in a form which is recognizable by the user.

The HMI 120 generates a control command that instructs an execution (ON) or a release (OFF) of an automatic parking function according to the manipulation of the user. In addition, the HMI 120 visually and/acoustically outputs information on an operation state of the vehicle, guide information for each of parking steps, and the like.

The vehicle sensor 130 senses behavior information of the vehicle including vehicle velocity, a steering angle, wheel velocity, whether or not a brake is operated, whether or not an accelerator pedal is operated, a position, of a shift lever, and the like. That is, the vehicle sensor 130 includes a vehicle velocity sensor, a steering angle sensor, and the like.

The controller 140 is connected to the parking slot searcher 110, the HMI 120, the vehicle sensor 130, the driving controller 150, the braking controller 160, a shift controller 170, and the steering controller 180 via a vehicle network. Here, the vehicle network is implemented as a controller area network (CAN), a media oriented system transport (MOST) network, a local interconnect network (LIN), X-by-Wire (Flexray), or the like.

When the controller 140 receives a control command instructing an activation of the automatic parking function through the HMI 120, the controller 140 executes the automatic parking function. For example, when the user turns on a parking switch, the controller 140 recognizes the turn on of the parking switch through the HMI 120.

The controller 140 searches parking slots using the parking slot searcher 110 and selects any one of the searched parking slots as a target parking slot. In addition, the controller 140 calculates a parking trajectory for parking the vehicle in the target parking slot, and sequentially generates one or more parking steps along the parking trajectory.

The controller 140 controls the driving controller 150, the braking controller 160, the shift controller 170, and the steering controller 180 to sequentially perform the respective parking steps.

The driving controller 150 controls an engine driving and adjusts acceleration of the vehicle. The driving controller 150 is implemented as an engine control unit (ECU).

The braking controller 160, which is to control deceleration of the vehicle, is implemented as an electronic stability control (ESC).

The shift controller 170 serves to shift a gear (shift level) of the vehicle. The shift controller 170 is implemented as an electronic shifter or a shift by wire (SBW).

The steering controller 180, which is to control a steering of the vehicle, is implemented as a motor drive power steering (MDPS).

Figure 2:
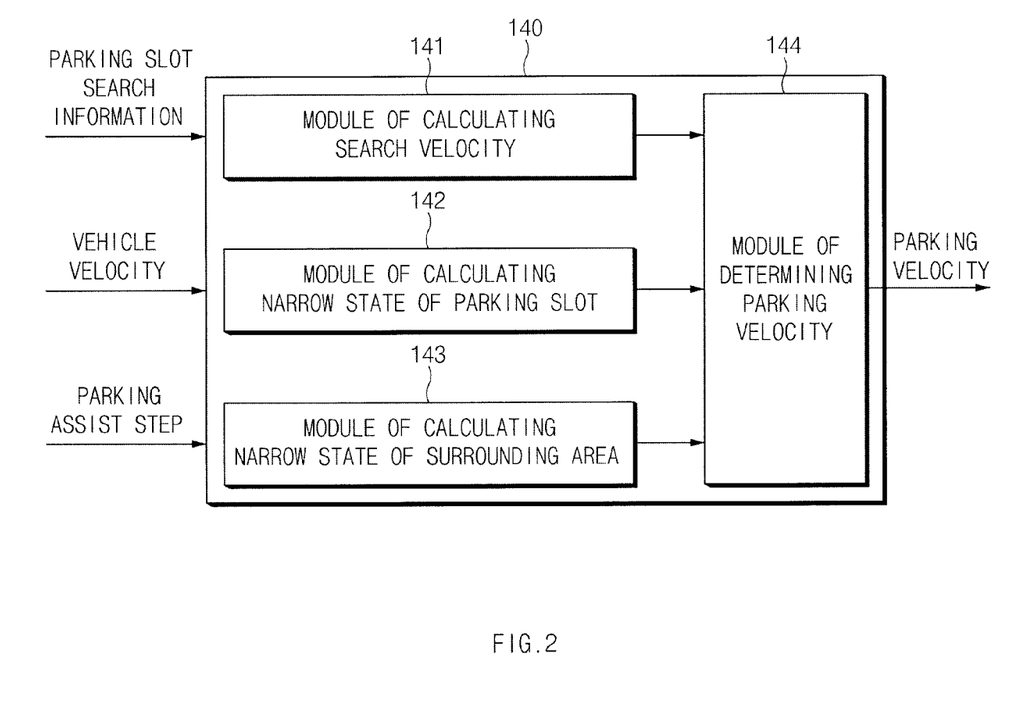
FIG. 2 is a block configuration diagram of a controller illustrated in FIG. 1.

FIG. 2 illustrates a block configuration diagram of the controller illustrated in FIG. 1.

The controller 140 receives parking slot search information, vehicle velocity, and a parking assist step (parking step) output from the parking slot searcher 110, the HMI 120, and the vehicle sensor 130. The controller 140 determines parking velocity on the basis of the parking slot search information, the vehicle velocity, and the parking assist step. The controller 140 performs a parking of the vehicle at the determined parking velocity.

The controller 140 includes a module 141 for calculating search velocity, a module 142 for calculating a narrow state of a parking slot, a module 143 for calculating a narrow state of a surrounding area, and a module 144 for determining parking velocity, as illustrated in FIG. 2.

The module 141 for calculating search velocity measures velocity at which the driver searches the parking slot using the parking slot searcher 110 at the time of searching the parking slot and records the measured velocity. The recorded search velocity of the driver is used to analyze propensity of the driver.

In addition, the module 141 for calculating search velocity calculates average search velocity $V_{sear}$ of the measured search velocity. The module 141 for calculating search velocity calculates weight U (=$V_{sear}/V_{sear\_max}$) of the calculated average search velocity $V_{sear}$ to maximum search velocity $V_{sear\_max}$.

The module 142 for calculating a narrow state of a parking slot calculates the narrow state $D_{slot}$ of the parking slot on the basis of a size of the parking slot. The module 142 of calculating a narrow state of a parking slot calculates weight V (=$D_{slot}/D_{slot\_min}$) of the parking slot to a minimum parkable slot $D_{slot\_min}$.

The module 143 for calculating a narrow state of a surrounding area calculates the narrow state of the surrounding area other than the parking slot. The module 143 for calculating a narrow state of a surrounding area calculates weight W (=$O_{dis}/O_{dis\_min}$) as a distance Odis between a self vehicle and a surrounding obstacle is closer as compared to a minimum surrounding obstacle distance $O_{dis\_min}$ capable of assisting a parking.

The module 144 for determining parking velocity calculates the parking velocity $V_{parking}$ (=(U, V, W)×$V_{basic}$) using the weights calculated for the search velocity of the parking slot, the narrow state of the parking slot, and the narrow state of the surrounding area. The parking velocity is proportional to the weight U of the search velocity of the parking slot and the weight V of the narrow state of the parking slot, and is proportional to the weight W of the narrow state of the surrounding area.

The module 144 for determining parking velocity updates the weights of the narrow state of the parking slot and the narrow state of the surrounding area for each of a forward step or a backward step.

The module 144 for determining parking velocity determines the parking velocity between minimum parking velocity $V_{min}$ and maximum parking velocity $V_{max}$ which are set.

Figure 3:
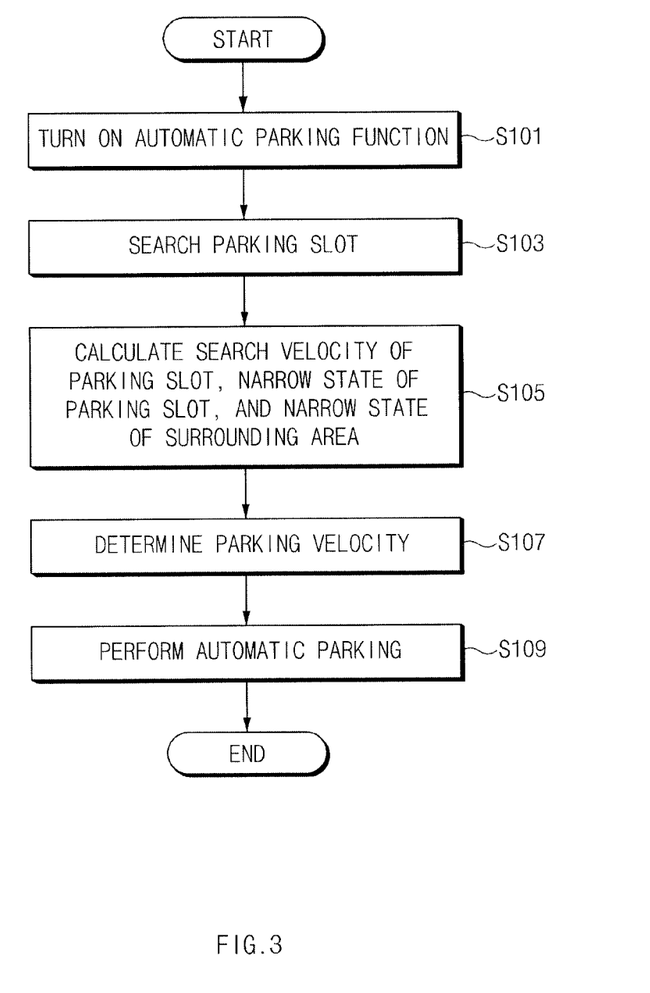
FIG. 3 is a flowchart illustrating a method for operating an automatic parking assist system.

FIG. 3 is a flowchart illustrating a method for operating an automatic parking assist system.

First, when the controller 140 receives a parking assist execution command from the user through the HMI 120, the controller 140 executes an automatic parking function (S101). For example, when the user turns on a parking switch, the controller 140 receives a user input using the HMI 120 and activates the automatic parking assist system.

When the automatic parking assist system is turned on, the controller 140 searches a parking slot around the vehicle using the parking slot searcher 110 (S103). The parking slot searcher 110 searches surrounding areas of the vehicle using a distance sensor such as an ultrasonic sensor. The parking slot searcher 110 obtains parking slot search information such as search velocity of a parking slot of a driver, a size of the parking slot of the vehicle, obstacles around the vehicle, and/or distances from other parked vehicles.

The controller 140 calculates the search velocity of the parking slot of the driver, a narrow state of the parking slot, and a narrow state of a surrounding area (S105). The controller 140 calculates weights for the search velocity of the parking slot, the narrow state of the parking slot, and the narrow state of the surrounding area.

The controller 140 calculates velocity at which a parking is performed, that is, parking velocity by taking account of the search velocity of the parking slot of the driver, the narrow state of the parking slot, and the narrow state of the surrounding area (S107). The controller 140 calculates the parking velocity using the weights for the search velocity of the parking slot, the narrow state of the parking slot, and the narrow state of the surrounding area.

The controller 140 performs an automatic parking of the vehicle at the calculated parking velocity (S109).

Figure 4:
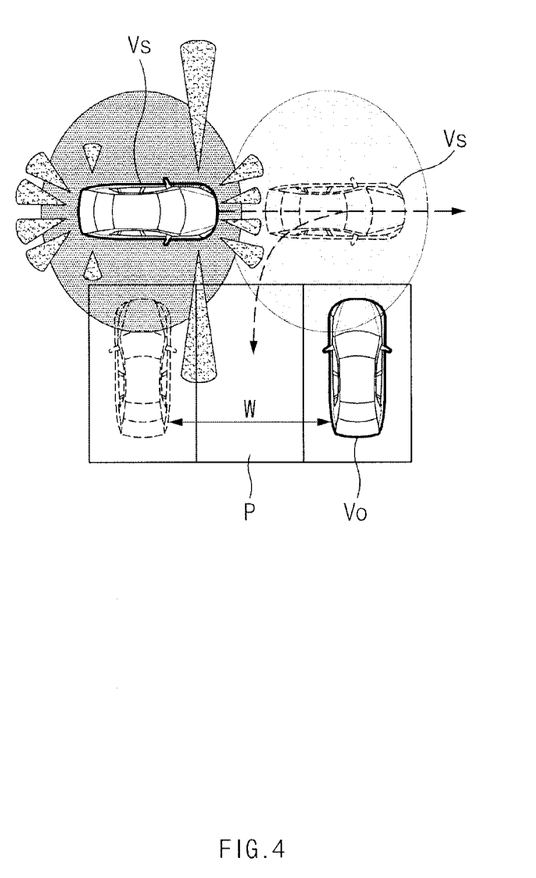
FIG. 4 is an example in which a perpendicular parking is performed.

FIG. 4 illustrates an example in which a perpendicular parking is performed.

The present exemplary form describes a case in which the obstacles do not exist or only one parked vehicle $V_o$ exists around a parking slot P in which a self vehicle Vs is intended to be parked, as illustrated in FIG. 4.

The controller 140 determines parking velocity for each of the situations using set remote automatic maximum parking velocity $v_{p,max}$ and the calculated weight.

In the case in which the driver searches the parking slot P in which the self vehicle Vs is intended to be parked in a situation in which a width W of the parking slot P is wide or only one parked vehicle Vo exists in an open area around which the obstacles do not exist, the controller 140 calculates the parking velocity using the weight for the search velocity of the parking slot of the driver.

The parking velocity $v_p$ is expressed by the following Equation 1.

$$v_p = \frac{v_{sear}}{v_{sear,max}} v_{p,max} \qquad \text{[Equation 1]}$$

where $v_{sear}$ is the search velocity of the parking slot of the driver and $v_{sear,max}$ is maximum searchable velocity.

In the case in which the driver searches the parking slot P in which the self vehicle Vs is intended to be parked at fast velocity, a fast parking is performed by taking account of the search velocity of the parking slot of the driver in order to minimize an awareness of difference.

Figure 5:
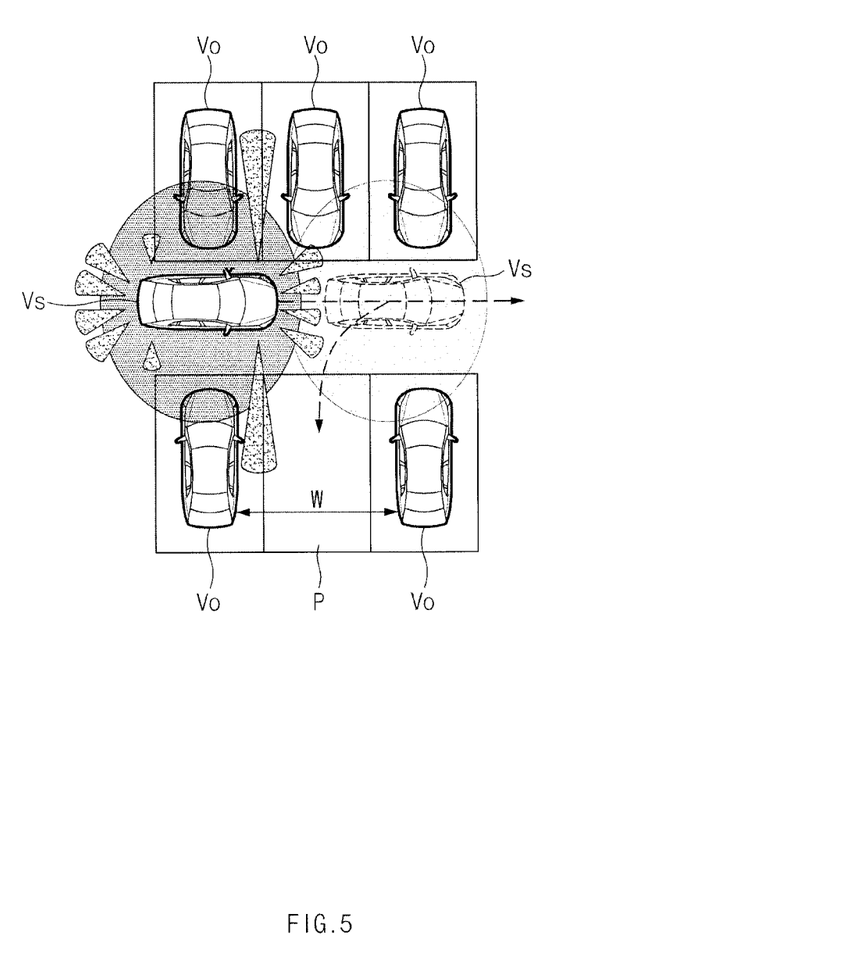
FIG. 5 is another example in which a perpendicular parking is performed.

FIG. 5 illustrates another example in which a perpendicular parking is performed.

The present exemplary form describes a case in which the obstacles exist around the parking slot P in which the self vehicle is intended to be parked, by way of example.

As illustrated in FIG. 5, in the case in which the obstacles are detected around the vehicle or the width W of the parking slot is narrow at the time of searching the parking slot, the parking velocity is calculated using the weights for the search velocity of the parking slot, the narrow state of the parking slot, and the narrow state of the surrounding area.

Here, the maximum parking velocity $v_{p,max}$ is maximum parking velocity of a set remote automatic parking.

In the case in which the obstacles of the surrounding area exist, the parking velocity is set according to the search velocity of the parking slot of the driver and a distance from a proximity obstacle (the narrow state of the surrounding area) in order to reduce the awareness of difference.

Figure 6:
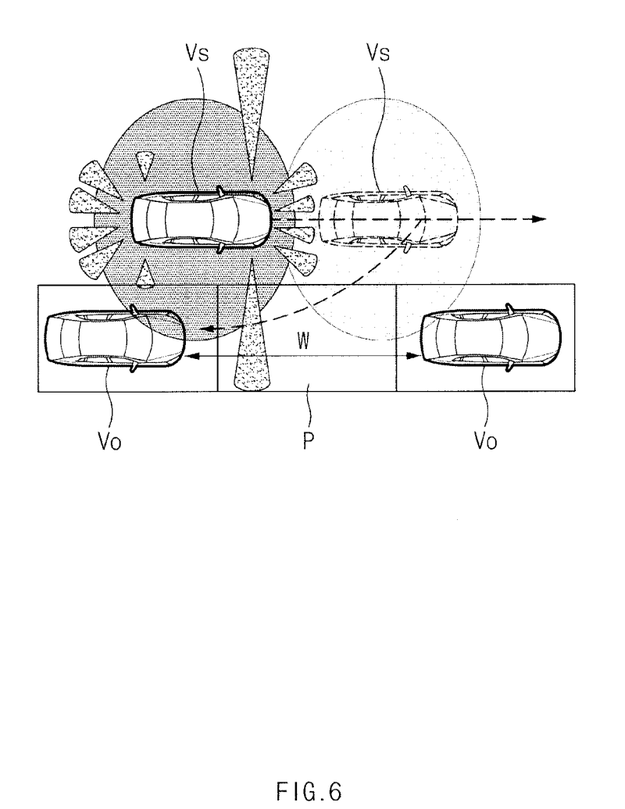
FIG. 6 is an example in which a parallel parking is performed.

FIG. 6 illustrates an example in which a parallel parking is performed.

The present exemplary form describes a case in which the driver searches the parking slot at fast velocity in a situation in which a parking execution area is wide in an open area around which the obstacles do not exist, by way of example.

The controller 140 determines the parking velocity by taking account of the weight for the search velocity of the driver to the set maximum parking velocity $v_{p,max}$.

In the present exemplary form, since the parking execution area in the open area is wide, the controller 140 calculates the parking velocity using the weight for the search velocity of the driver. Therefore, in forms of the present disclosure, the awareness of difference of the driver may be reduced.

Figure 7:
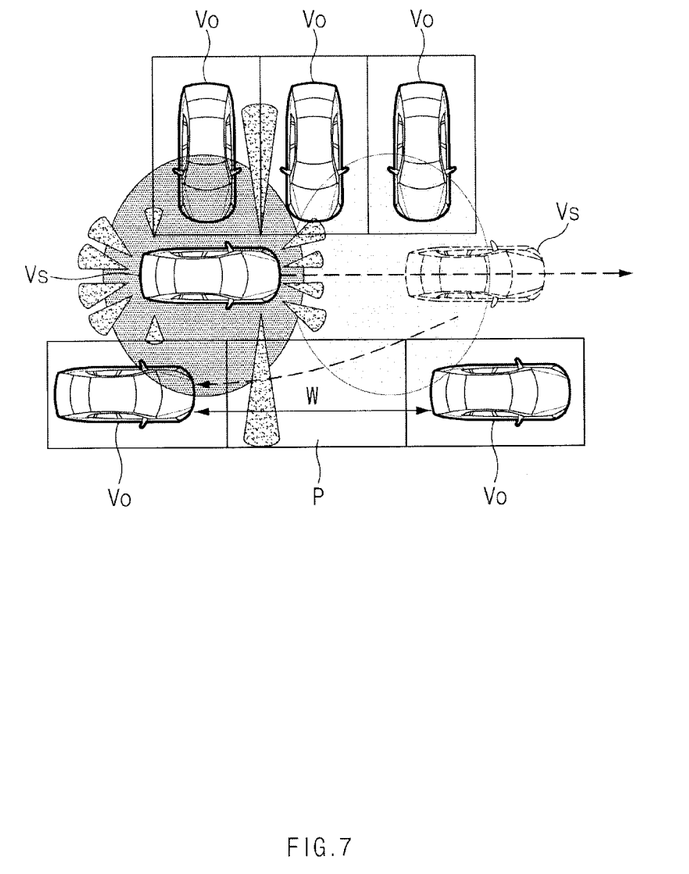
FIG. 7 is another example in which a parallel parking is performed.

FIG. 7 illustrates another example in which a parallel parking is performed.

In the case in which the obstacles exist around the self vehicle Vs or the width W of the parking slot is narrow, the parking velocity is calculated using the weights for the search velocity of the parking slot, the narrow state of the parking slot, and the narrow state of the surrounding area to the set remote automatic maximum parking velocity.

In the case in which the obstacles of the surrounding area of the self vehicle exist, the controller 140 sets the parking velocity according to the search velocity of the parking slot of the driver and a distance from a proximity obstacle (the narrow state of the surrounding area) in order to reduce the awareness of difference.

As described above, in exemplary forms of the present disclosure, the parking velocity may be determined by taking account of the search velocity of the driver, the narrow state of the parking slot, and the narrow state of the surrounding area of the parking slot at the time of searching the parking slot, and the automatic parking may be performed at the determined parking velocity.

As such, in forms of the present disclosure, since the parking velocity is set according to the parking situation, the awareness of difference of the driver is decreased and a desire of the driver is satisfied, thereby making it possible to improve a customer satisfaction measurement.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An automatic parking assist system comprising:
    a parking slot searcher configured to search a surrounding of a vehicle, obtain parking slot search information, and identify a parking slot for performing a parking of the vehicle;
    a vehicle sensor configured to sense behavior information of the vehicle; and
    a controller configured to:
        determine a parking velocity of the vehicle based on the parking slot search information and the behavior information, wherein the parking slot search information includes at least one of a search velocity of the parking slot, a narrow state of the parking slot, and a narrow state of the surrounding area; and
        perform the parking of the vehicle in the parking slot at the parking velocity.

2. The automatic parking assist system according to claim 1, wherein the parking slot searcher is configured to utilize at least one of a plurality of ultrasonic sensors, radar, or lidar.

3. The automatic parking assist system according to claim 1, wherein the vehicle sensor includes
    a vehicle velocity sensor configured to measure velocity of the vehicle; and
    a steering angle sensor configured to measure a steering angle of the vehicle.

4. The automatic parking assist system according to claim 1, wherein the controller is configured to:
    calculate the search velocity based on a measured velocity when the parking slot searcher is activated to search for the parking slot and prior to identifying the parking slot;
    calculate the narrow state of the parking slot based on a measured size of the parking slot; and
    calculate the narrow state of the surrounding area based on a measured size of other parking slots adjacent to the parking slot.

5. The automatic parking assist system according to claim 4, wherein the controller is configured to calculate an average search velocity of velocity at which the driver searches the parking slot.

6. The automatic parking assist system according to claim 5, wherein the controller is configured to calculate a weight of the average search velocity to maximum searchable velocity.

7. The automatic parking assist system according to claim 4, wherein the controller is configured to calculate a weight of the parking slot to a minimum parkable slot.

8. The automatic parking assist system according to claim 4, wherein the controller is configured to calculate a weight according to a distance between a self vehicle and a surround obstacle to a parking assistable minimum distance between the self vehicle and a surrounding obstacle,
    wherein the weight is a distance between the self vehicle and the surround obstacle divided by a minimum surrounding obstacle distance.

9. A method for operating an automatic parking assist system, the method comprising:
    searching a surrounding of a vehicle and obtaining parking slot search information;
    calculating search velocity of a parking slot, a narrow state of the parking slot, and a narrow state of a surrounding area on the basis of the parking slot search information;
    determining parking velocity based on the search velocity of the parking slot, the narrow state of the parking slot, and the narrow state of the surrounding area; and
    performing a parking of the vehicle in the parking slot at the parking velocity.

10. The method according to claim 9, wherein in the searching of the surrounding of the vehicle, the parking slot and a surrounding area other than the parking slot are searched using sensors mounted on a front, a side, and a rear of the vehicle.

11. The method according to claim 10, wherein the sensors are configured to utilize at least one of an ultrasonic sensor, radar, or lidar.

12. The method according to claim 9, wherein the calculating of the search velocity of the parking slot, the narrow state of the parking slot, and the narrow state of the surrounding area includes
    calculating average search velocity at which a driver searches the parking slot; and
    calculating weight of the average search velocity to maximum searchable velocity.

13. The method according to claim 9, wherein in the calculating of the search velocity of the parking slot, the narrow state of the parking slot, and the narrow state of the surrounding area, weight of the parking slot to minimum parkable slot is calculated.

14. The method according to claim 9, wherein in the calculating of the search velocity of the parking slot, the narrow state of the parking slot, and the narrow state of the surrounding area, weight of a distance between a self vehicle and an obstacle to a parking assistable minimum distance between the self vehicle and a surrounding obstacle is calculated,
    the weight is a distance between the self vehicle and the surround obstacle divided by a minimum surrounding obstacle distance.

* * * * *